United States Patent [19]

Sato

[11] Patent Number: 5,565,782
[45] Date of Patent: Oct. 15, 1996

[54] ELECTRONIC APPARATUS HAVING KEY TONE FOR REPORTING RESIDUAL AMOUNT OF BATTERY CAPACITY

[75] Inventor: Osamu Sato, Tokyo, Japan

[73] Assignee: NEC Corporation, Japan

[21] Appl. No.: 396,010

[22] Filed: Feb. 28, 1995

[30] Foreign Application Priority Data

Feb. 28, 1994 [JP] Japan .................................. 6-052643

[51] Int. Cl.$^6$ .................................................. G01R 27/26
[52] U.S. Cl. ........................... 324/435; 340/636; 341/27; 364/710.12
[58] Field of Search ............................ 324/435, 433; 340/636; 341/27, 21; 364/710.12

[56] References Cited

U.S. PATENT DOCUMENTS

| | | | |
|---|---|---|---|
| 4,060,848 | 11/1977 | Hyatt | 364/710.12 |
| 4,211,892 | 7/1980 | Tanimoto et al. | 364/710.12 |
| 4,412,210 | 10/1983 | Washizuka et al. | 364/710.12 |
| 4,452,119 | 6/1984 | Tanimoto | 364/710.12 |
| 4,609,914 | 9/1986 | Fathi | 324/435 |
| 4,727,310 | 2/1988 | Hashimoto et al. | 364/710.12 |
| 5,151,873 | 8/1992 | Hirsh | 364/710.12 |
| 5,239,286 | 8/1993 | Komatsuda | 340/636 |
| 5,304,986 | 4/1994 | Motegi | 340/636 |

FOREIGN PATENT DOCUMENTS

| | | | |
|---|---|---|---|
| 0514265 | 11/1992 | European Pat. Off. | 324/435 |
| 2-295385 | 12/1990 | Japan . | |
| 4-36818 | 2/1992 | Japan . | |
| 4-191914 | 7/1992 | Japan . | |
| 4-236379 | 8/1992 | Japan . | |
| 2254500 | 10/1992 | United Kingdom | 324/435 |

*Primary Examiner*—Maura K. Regan
*Attorney, Agent, or Firm*—Scully, Scott Murphy & Presser

[57] ABSTRACT

An electronic apparatus powered by a battery and having a keyboard is disclosed. When a key provided on the keyboard is operated, a key tone generating circuit generates a key tone. A setting circuit sets at least one of the loudness, pitch, duration and other attributes of the key tone. A measuring circuit measures the residual amount of the capacity of the battery in terms of a voltage. The setting circuit changes the attribute of the key tone in response to the output of the measuring circuit. The apparatus allows the user to see the residual amount of the battery capacity on the basis of a different between such key tones, i.e., without looking at a display.

10 Claims, 8 Drawing Sheets

ELECTRONIC APPARATUS HAVING KEY TONE FOR REPORTING RESIDUAL AMOUNT OF BATTERY CAPACITY

BACKGROUND OF THE INVENTION

The present invention relates to an electronic apparatus powered by a replaceable battery or a rechargeable battery and, more particularly, to an electronic apparatus capable of alerting the user to the residual amount of a battery capacity.

The prerequisite with an electronic apparatus powered by a battery is that it be protected from errors in the event of the voltage drop of the battery. For this purpose, such an apparatus is provided with a detecting circuit responsive to the drop of the battery voltage to below a predetermined value, and an alerting device for urging, in response to the output of the detecting circuit, the user to replace the battery by a visible or audible indication.

Electronic apparatuses having the alerting device mentioned above are disclosed in the various documents, as follows. Japanese Patent Laid-Open Publication No. 4-191914 teaches a battery-powered computer having a detecting circuit responsive to the run-down of a battery. When the battery runs down as detected by the detecting circuit, a cursor appearing on a display has an attribute thereof changed to inform the user of the run-down. Japanese Patent Laid-Open Publication No. 4-36818 proposes an electronic apparatus having a display implemented as two light emitting diodes of different colors. The light emitting diodes are selectively turned on display the voltage drop of a battery to below a predetermined value in three consecutive steps. Japanese Patent Laid-Open Publication No. 4-236379 discloses an electronic apparatus capable of computing the residual amount of the capacity of a secondary battery and displaying it. Further, Japanese Patent Laid-Open Publication No. 2-295385 allows a television receiver or similar electronic apparatus having an audio function to alert the user to the run-down of a battery with an audible message.

As stated above, it has been customary with an electronic apparatus to use a display thereof in alerting the user to the remaining life of a battery. A television receiver or similar electronic apparatus having an audio function is exceptional in that it produces an audible alert message. This cannot be done with, for example, portable computers and electronic pocketbooks which lack an audio function. However, the problem with the alert relying on a display is that the user is apt to manipulate the apparatus without noticing the alert and becomes unable to operate it halfway. This problem occurs, for example, when the user is away from the apparatus when the alert appears on the display or when the user operates the apparatus, e.g., a computer for musical applications without watching the display.

Usually, alerting means of the kind described generates an alert just before the apparatus is fully disabled. Therefore, when the alert occurs in the midst of an operation needing a long period of time and inhibiting an interruption, the user is often prevented from taking an adequate measure immediately despite that the user is aware of the alert. While the alert representing the residual amount of the battery may be displayed either constantly or periodically, such an alert is wasteful in most cases and, moreover, gives the user an unfavorable impression as to the reliability of the apparatus. Although the alert using voice is free from this problem, it also prevents the user from taking an adequate measure when produced just before the stoppage of the apparatus.

SUMMARY OF THE INVENTION

It is, therefore, an object of the present invention to provide an electronic apparatus which allows the user to see the residual amount of a battery capacity without using a display and thereby allows the user to take an adequate measure before it is fully disabled.

It is another object of the present invention to provide an electronic apparatus which allows the user to recognize even the degree of the residual amount of a battery capacity when operated.

It is a further object of the present invention to provide an electronic apparatus capable of indicating the residual amount of a battery capacity by using existing equipment, i.e., without resorting to extra an alerting circuit.

In accordance with the present invention, an electronic apparatus powered by a battery and having a keyboard and capable of informing the user of the residual amount of the capacity the battery has a key tone generating circuit for generating a key tone when the keyboard is operated. A setting circuit sets an attribute of the key tone. A measuring circuit measures the residual amount of the capacity of the battery. A controller controls the setting circuit in response to the output of the measuring circuit such that the attribute of the key tone changes.

The setting circuit outputs a setting signal indicating a frequency which changes in accordance with the residual amount of the capacity. The key tone generating circuit changes the frequency of the key tone in response to the setting signal.

Alternatively, the setting signal may indicate an amplitude which changes in accordance with the residual amount of the capacity. Then, the key tone generating circuit will change the amplitude of the key tone in response to the setting signal.

If desired, the setting signal may indicate a duration which changes in accordance with the instantaneous residual amount of the capacity, in which case the key tone generating circuit will change the duration of the key tone in response to the setting signal.

Further, the apparatus may have a timer for counting a predetermined time interval, and a memory for storing the residual amount of the capacity measured by the measuring circuit. The controller causes the measuring circuit to measure the residual amount of the capacity at the predetermined time interval counted by the timer, writes the result of measurement in the memory, and causes, when the keyboard is operated, the setting circuit to set the attribute on the basis of the result of measurement stored in the memory.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENT

Figure 1:
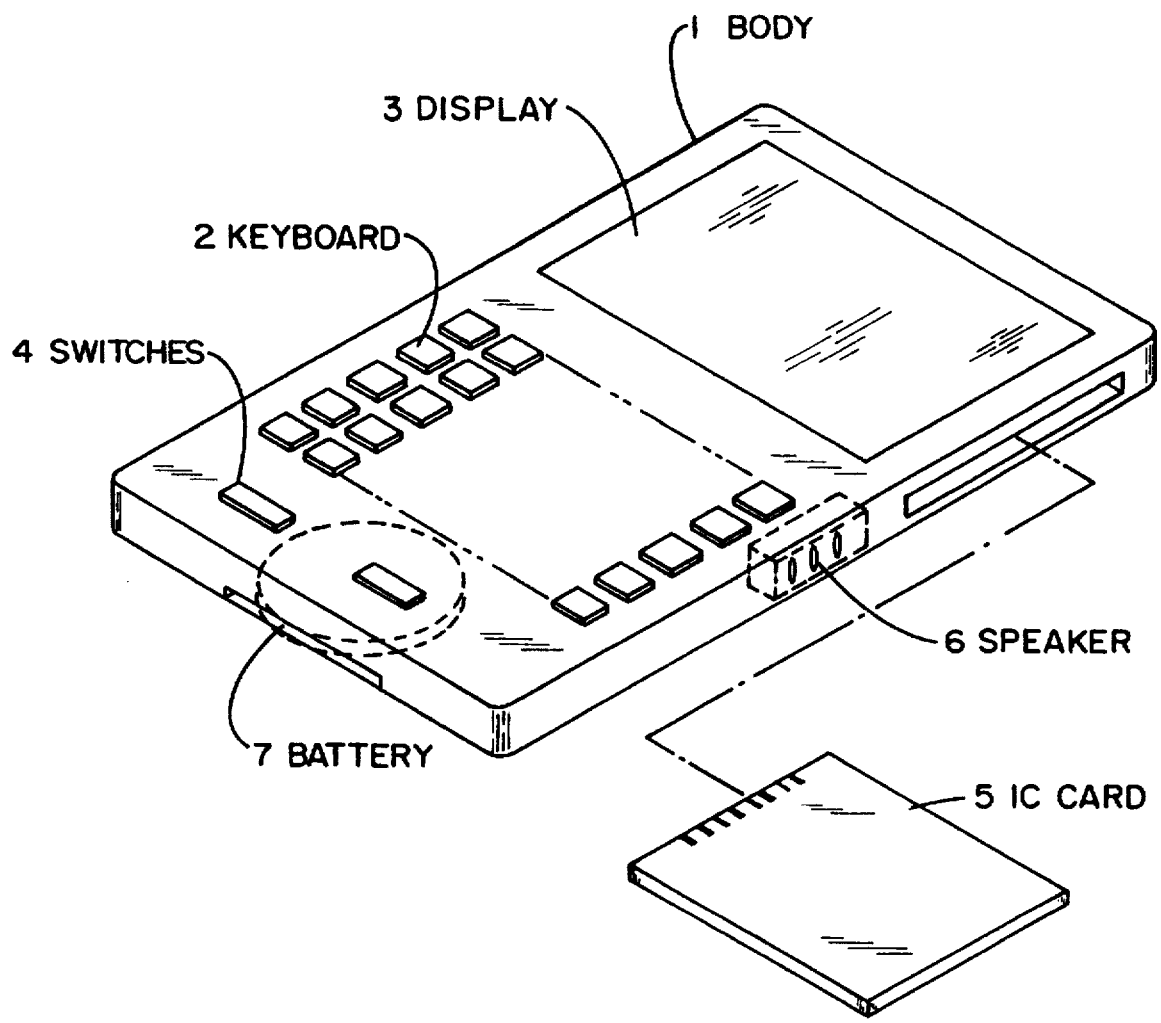
FIG. 1 is a perspective view of an electronic apparatus embodying the present invention and implemented as an electronic pocketbook.

Referring to FIG. 1 of the drawings, an electronic apparatus embodying the present invention is shown and implemented as an electronic pocketbook using a mercury battery or a nickel-cadmium battery. As shown, the pocketbook has a body 1 on which are arranged a keyboard 2, a display 3, and switches 4 including a power switch and function switches. An IC (Integrated Circuit) card 5 is removably mounted on one side of the body 1. A speaker 6 is built in the body 1 and produces a key tone when any one of the keys on the keyboard 2 is pressed. A battery 7 is removably received in the body 1.

Figure 2:
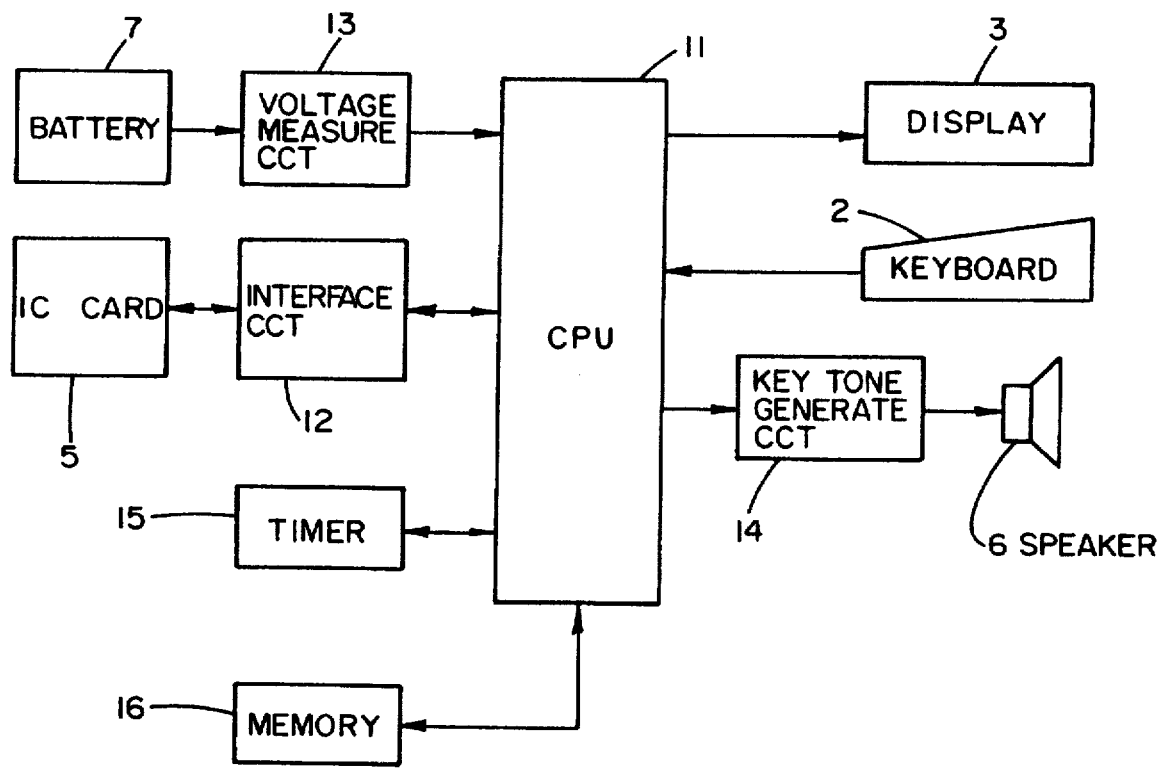
FIG. 2 is a block diagram schematically showing circuitry built in the electronic pocketbook.

FIG. 2 shows the circuitry of the pocketbook in a schematic block diagram. As shown, the display 3 and keyboard 2 are connected to a CPU (Central Processing Unit) or processor 11. The display 3 is implemented by an LCD (Liquid Crystal Display) and displays data necessary for the user. In the illustrative embodiment, a number of keys corresponding to alphabets are arranged on the keyboard 2. The user may operate such keys to enter desired data in the pocketbook. Data entered on the keys are applied to the CPU 11. The IC card 5 is connected to the CPU 11 via an interface circuit 12 in order to interchange necessary data with the CPU 11. The battery 7 is implemented as a mercury, nickel-cadmium or similar battery and supplies power to the various sections of the pocketbook via wirings, not shown. A voltage measuring circuit 13 measures the voltage of the battery 7 and sends the result of measurement to the CPU 11 in the form of a digital value. In the embodiment, the voltage measuring circuit 13 is implemented by an analog-to-digital converter (ADC).

A key tone generating circuit 14 generates a predetermined key tone set by the CPU 11. The key tone is produced via the speaker 6. The key tone generating circuit 14 produces a key tone also when the pocketbook executes predetermined processing or displays various data, although such a feature will not be described specifically. A timer 15 counts a period of time set by the CPU 11 and, when the time expires, delivers a time signal to the CPU 11. A memory 16 is comprised of a RAM (Random Access Memory) and allows various kinds of data to be written and read thereoutof.

Figure 3:
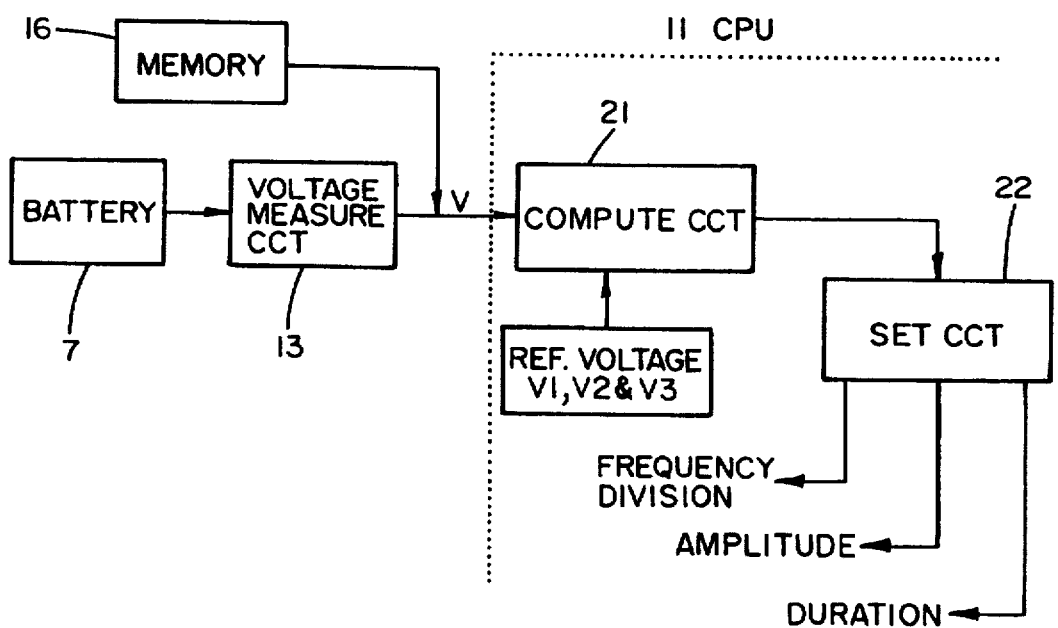
FIG. 3 is a schematic block diagram showing part of a processor included in the pocketbook and for generating various setting signals.

FIG. 3 shows part of the CPU 11 for controlling the key tone generating circuit 14. As shown, the voltage V of the battery 7 measured by the voltage measuring circuit 13 is input to a computing circuit 21. In the illustrative embodiment, the voltage V is once written to the memory 16 and read out and fed to the computing circuit 21 at a predetermined timing. A plurality of reference voltages, e.g., first to third reference voltages V1, V2 and V3 are input to the computing circuit 21. The computing circuit 21 sequentially compares the measured voltage V with the reference voltages V1–V3 by, for example, subtraction and feeds the result of comparison to a setting circuit 22. The setting circuit 22 is capable of recognizing a relation in size between the measured voltage V and the reference voltages V1–V3. The setting circuit 22 sends, based on the result of recognition, signals representing a particular frequency division number, amplitude, and duration or time, respectively.

Figure 4:
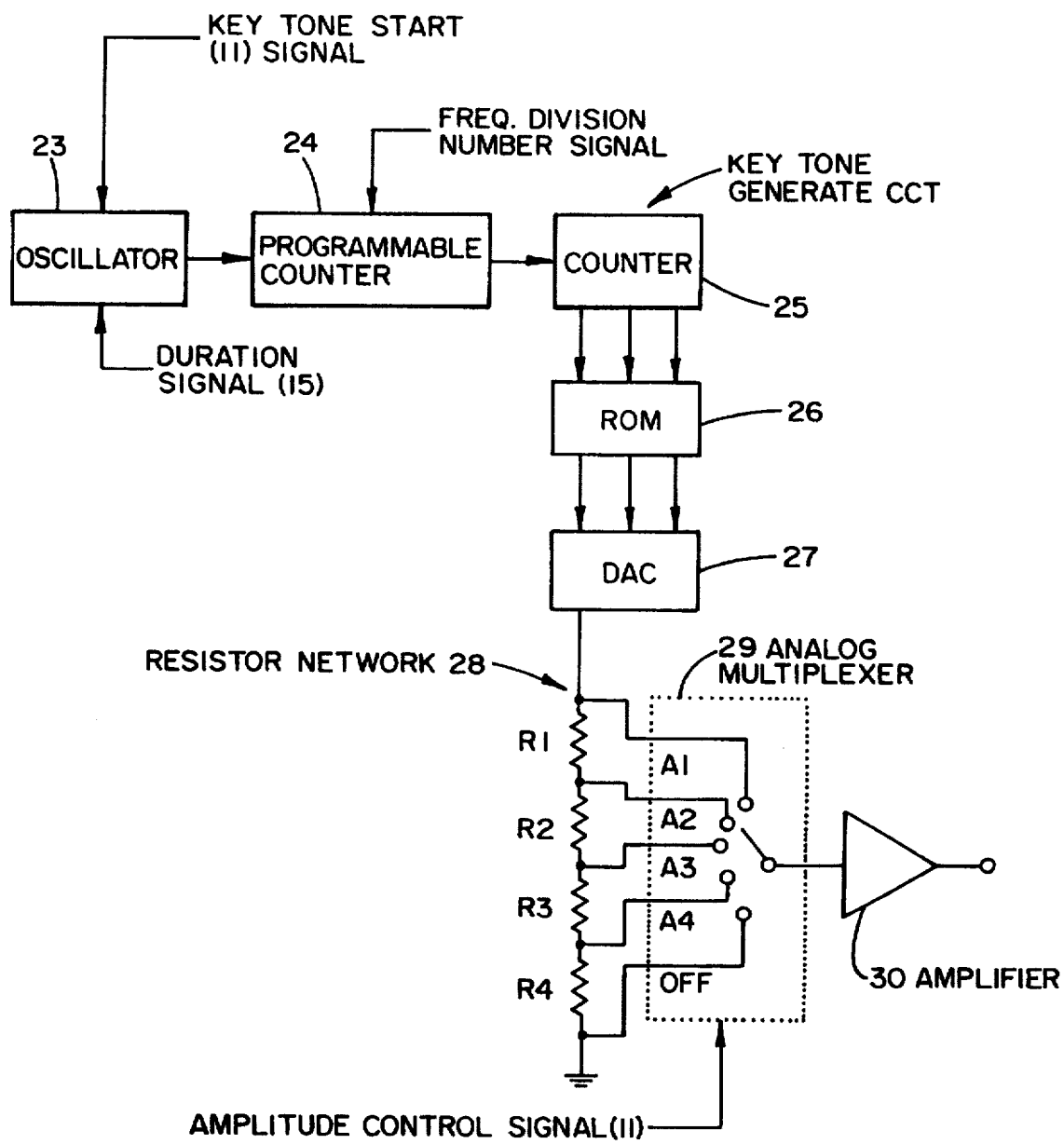
FIG. 4 is a schematic block diagram of a key tone generating circuit also included in the pocketbook.

The key tone generating circuit 14 is shown in FIG. 4 specifically. As shown, the circuit 14 has an oscillator 23 for outputting a clock signal. While various kinds of oscillators are available, a CR type oscillator or an a stable multivibrator is often used due to its simple configuration. When the keyboard 2 is operated, the oscillator 23 starts oscillating in response to a signal from the CPU 11. The oscillation of the oscillator 23 stops when a time signal is fed from the timer 15 to the oscillator 23. As a result, the oscillation continues only for the period of time counted by the timer 15. Alternatively, a switch may be connected to the output of the oscillator 23 and turned on by a signal from the CPU 11; the oscillation also stops in response to the time signal from the timer 15. This alternative arrangement insures an oscillation output free from the influence of a delay particular to the start-up of the oscillator 23.

The clock signal from the oscillator 23 is input to a programmable counter 24 in which a frequency division number can be set from the outside. The frequency division number of the programmable counter 24 is specified by, among the output signals of the setting circuit 21 shown in FIG. 3, the frequency division number signal. The clock signal whose frequency is divided by the counter 24 is delivered to a serial input parallel output counter 25. The output of the counter 25 is connected to the address input of a ROM (Read Only Memory) 26. Every time the counter 25 is incremented, it increments the address of the ROM 26. The output of the ROM 26 is connected to a digital-to-analog converter (DAC) 27. The ROM 26 stores, in order of address, data which cause the DAC 27 to generate a signal close to a sinusoidal wave. The output of the DAC 27 is connected to a resistor network 28 whose junctions are connected to the inputs of an analog multiplexer 29.

The resistor network 28 has a plurality of resistors, e.g., four resistors R1–R4 in the embodiment and five junctions A1–A4 and OFF. The network 28 divides the amplitude of the sinusoidal wave output from the DAC 27 with the resistors R1–R4 and delivers the resulting voltages to the analog multiplexer 29 via the junctions A1–A4 and OFF (A1>A2>A3>A4; OFF=0). The multiplexer 29 selects one of the five junctions of the network 28 in response to the amplitude signal from the setting circuit 21 of the CPU 11. The output of the multiplexer 29 is applied to an amplifier 30 and amplified thereby. The output of the amplifier 30 is fed to the speaker 6 with the result that a key tone is produced from the speaker 6. When the multiplexer 29 selects the junction OFF of the network 28, the key tone is interrupted.

Figure 5:
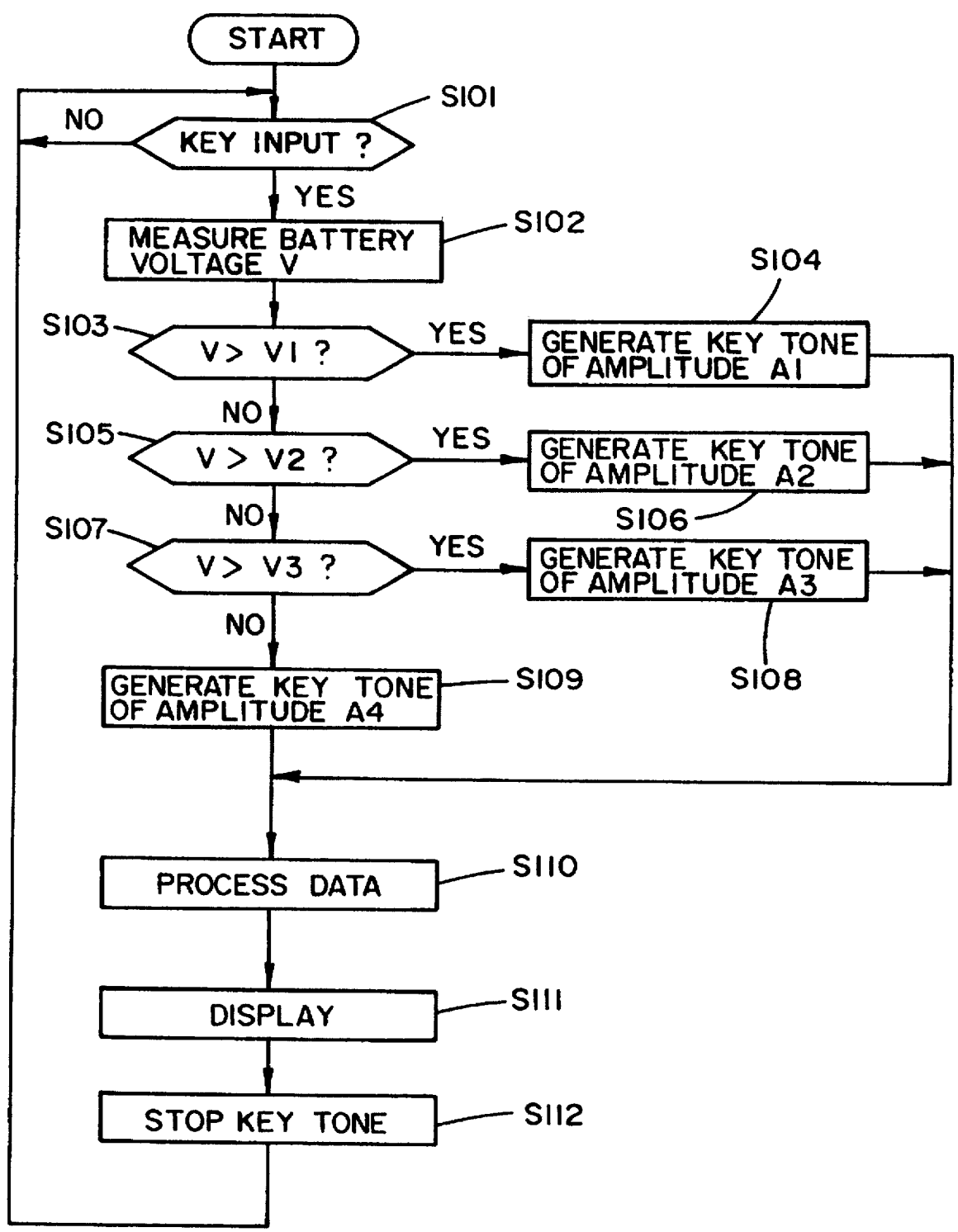
FIG. 5 is a flowchart demonstrating a first key tone generation procedure available with the embodiment.

How the embodiment alerts the user to a voltage drop with the key tone will be described hereinafter. FIG. 5 shows a first key tone generation procedure available with the embodiment, i.e., CPU 11. As shown, the CPU 11 usually awaits a key input to appear when the user operates the keyboard 2 (step S101). In response to a key input (YES, step S101), the CPU 11 executes data processing (step S110) and data display on the display 3 (step S111) as originally expected with the electronic pocketbook. Before the steps S110 and S111, the voltage measuring circuit 13 measures the voltage of the battery 7 (step S102). The measured voltage V is directly applied to the computing circuit 21 and sequentially compared with the reference voltages V1, V2 and V3 thereby. Let a relation V1>V2>V3 hold by way of example. The result of comparison is fed to the setting circuit 21. In response, the setting circuit 22 outputs an amplitude signal. In this specific procedure, the setting circuit 21 does not output the frequency division number signal or the duration signal.

Specifically, the computing circuit 21 compares the measured voltage V with the highest reference voltage V1 (step S103). If V is higher than V1 (YES, step S103) as determined by the circuit 21, the setting circuit 22 outputs an amplitude signal having an amplitude A1 (step S104). If otherwise (NO, step S103), the computing circuit 21 compares the voltage V with the medium reference voltage V2 (step S105). If V is higher than V2 (YES, step S105), the setting circuit 22 outputs an amplitude signal having an amplitude A2 (step S106). If otherwise (NO, step S105), the computing circuit 21 compares the voltage V with the lowest reference voltage V3 (step S107). If V is higher than V3 (YES, step S107), the setting circuit 22 outputs an amplitude signal having an amplitude A3 (step S108). If otherwise (NO, step S107), the setting circuit 22 outputs an amplitude signal having an amplitude A4 (step S109). The amplitude signal from the setting circuit 22 is applied to the analog multiplexer 29. In response, the multiplexer 29 selects one of the junctions A1–A4 of the resistor network 28.

In the key tone generating circuit 14, the clock signal from the oscillator 23 is divided by a predetermined division number by the programmable counter 24 and then output as a sinusoidal wave signal having a predetermined amplitude via the counter 25, ROM 26 and DAC 27. The sinusoidal wave signal is input to the resistor network 28. As a result, the multiplexer 29, selecting one of the junctions A1–A4, outputs a sinusoidal wave signal having an amplitude whose peak matches the voltage on the junction selected. That is, the output signal of the multiplexer 29 has an amplitude matching the amplitude signal generated by the setting circuit 22. Since the amplitude sequentially decreases from the junction A1 to the junction A4 stepwise, a sinusoidal wave signal having a particular amplitude matching the result of comparison of the voltage V with the reference voltages V1–V4 is output. This signal is amplified by the amplifier 30 and then produced from the speaker 6 as a key tone. Consequently, the loudness of the key tone decreases stepwise as the voltage of the battery 7 drops.

With the above arrangement, the notebook allows the user to see the residual amount of the battery capacity on the basis of the loudness of the key tone when the user operates the keyboard 2. The difference in loudness between the key tones will be sufficiently recognized if the amplitude of the key tone is changed by 4 dB to 8 dB stepwise. When the residual amount of the battery capacity is zero, the multiplexer 29 selects the junction OFF of the resistor network 28. In this condition, the amplitude of the key tone is zero, i.e., no key tones are produced. This informs the user that the residual amount of the battery capacity is zero.

The key tone from the speaker 6 ends (step S112) after the display (step S111).

Figures 6A, 6B:
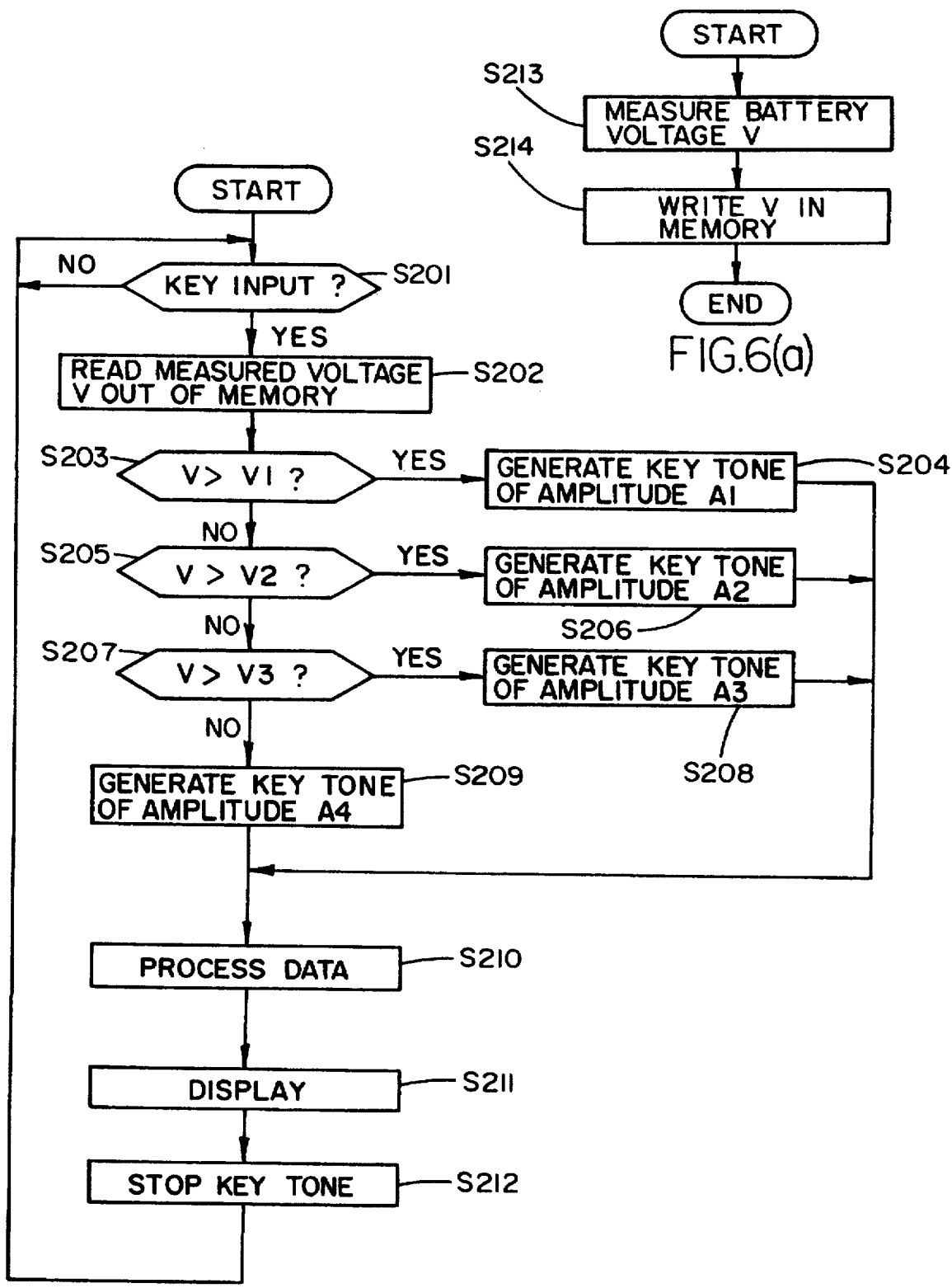
FIG. 6 is a flowchart demonstrating a modification of the procedure shown in FIG. 5.

FIGS. 6A and 6B demonstrate a modification of the first key tone generation procedure described above. For the part of the procedure shown in FIG. 6A, an arrangement is made such that a timer interrupt is repeatedly applied from the timer 15 to the CPU 11 at predetermined short intervals. As shown, in response to the timer interrupt, the CPU 11 causes the voltage measuring circuit 13 to measure the battery voltage (step S213), writes the measured voltage V in the memory 16 (step S214), and then quits the interrupt processing. Hence, the instantaneous voltage V measured by the circuit 13 is stored in the memory 16 at all times.

As shown in FIG. 6B, in response to a key input from the keyboard 2 (YES, step S201), the CPU 11 reads the measured voltage V out of the memory 16 (step S202). Then, the CPU 11 sequentially compares the voltage V with the reference voltages V1–V4 in the same manner as in the procedure of FIG. 5, and outputs an amplitude signal matching the result of comparison. On receiving the amplitude signal, the key tone generating circuit 14 generates a key tone having an amplitude based on the amplitude signal. This part of the procedure is represented by steps S203–S209. This is followed by data processing (step S210), data display (S211), and the stop of the key tone (step S212).

As stated above, the modified procedure measures the battery voltage at predetermined intervals beforehand, writes it in the memory 16, and reads it out in response to a key input. As a result, a key tone is produced at an earlier timing and, therefore, sounds more natural to the user. Specifically, when the voltage measuring circuit 13 is implemented by an ADC, it often needs a certain period of time for conversion. Therefore, if the battery voltage is measured after the confirmation of a key input, as in the procedure of FIG. 5, a key tone is delayed by the conversion time. Consequently, the notebook remains silent, although for a short period of time, between the operation of the keyboard 2 and the generation of a key tone, causing the user to feel uneasy. This is problematic since the key tone is originally expected to inform the user of the fact that a key input has been accepted by the apparatus.

Figure 7:
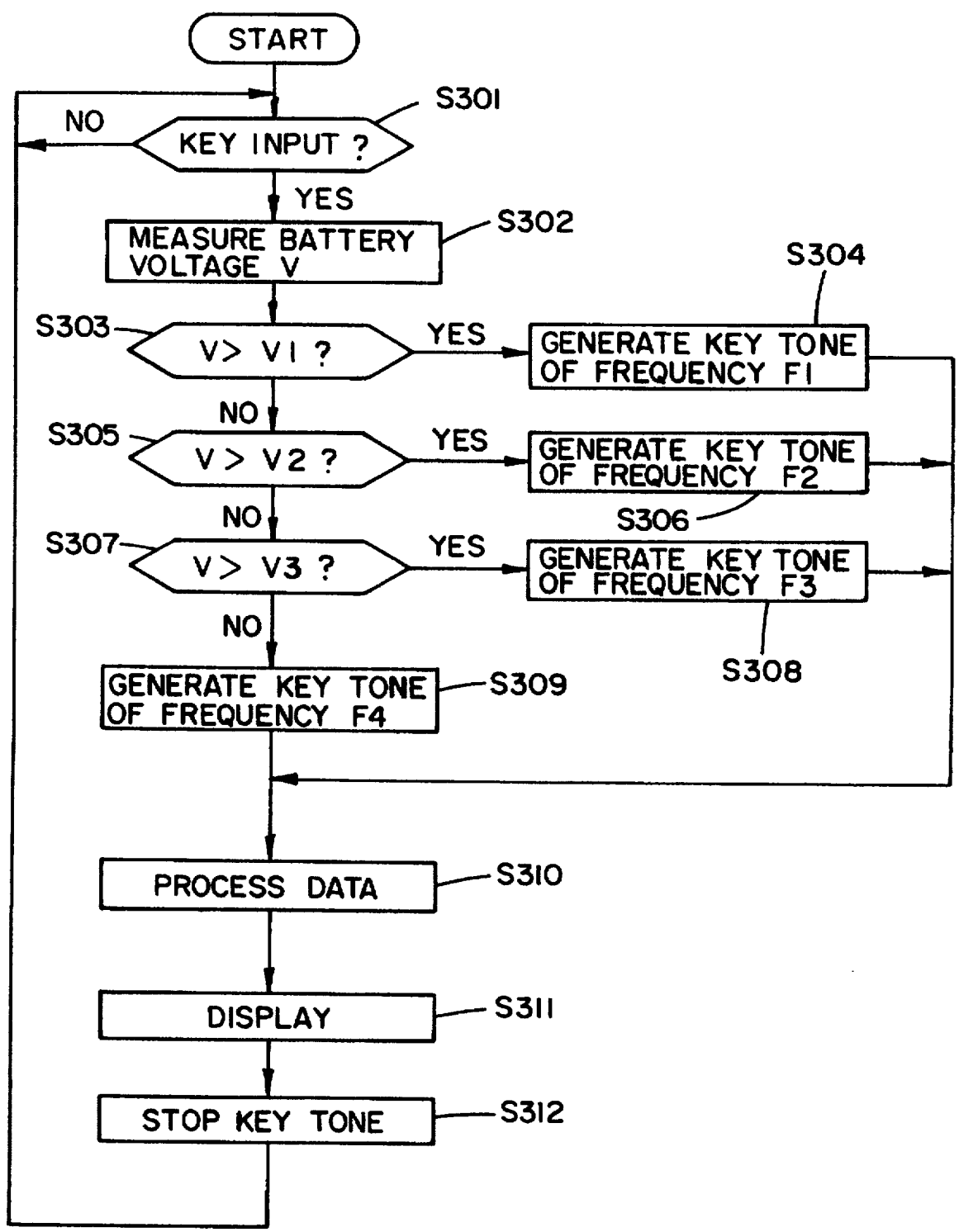
FIG. 7 is a flowchart representative of a second key tone generation procedure available with the embodiment.

Referring to FIG. 7, a second key tone generation procedure available with the embodiment will be described. Briefly, this procedure changes the pitch, or frequency, of the key tone. Specifically, the notebook is constructed such that the signal whose frequency is divided by the programmable counter 24, FIG. 4, has the frequency thereof changed to F1, F2, F3 or F4 stepwise (F1>F2>F3>F4). The frequency division numbers D1–D4 (D1<D2<D3<D4) are selected on the basis of a relation between the measured voltage V and the reference voltages V1–V3. This allows the frequency of the key tone to fall stepwise in accordance with the drop of the battery voltage.

As shown in FIG. 7, the CPU 11 usually awaits a key input from the keyboard 2. In response to a key input (YES, step S301), the CPU 11 measures the battery voltage (step S302) before executing data processing (step S310) and data display (S311) as originally expected of the notebook. The computing circuit 21 compares the measured voltage V with the reference voltages V1, V2 and V3 (V1>V2>V3). On receiving the result of comparison, the setting circuit 22 outputs a corresponding division number signal. In this procedure, the setting circuit 22 does not output the amplitude signal or the duration signal.

Specifically, the computing circuit 21 compares the measured voltage V with the highest reference voltage V1 (step S303). If V is higher than V1, the setting circuit 22 outputs a frequency division number signal representing the number D1. As an. result, a key tone having the frequency F1 is generated (step S304). If V is lower than V1, the computing circuit 21 compares V with the medium reference voltage V2 (step. S305). If V is higher than V2, the setting circuit 22 outputs a frequency division number signal representing the number D2, so that a key tone having the frequency F2 is generated (step S306). If V is lower than V2, the computing circuit 21 compares V with the lowest reference voltage V3 (step S307). If V is higher than V3, the setting circuit 22 outputs a frequency division number signal representing the number D3. As a result, a key tone having the frequency F3 is generated (step S308). If V is lower than V3, the setting circuit 22 outputs a frequency division number signal representing the number D4, so that a key tone having the frequency F4 is generated (step S309). The signal from the setting circuit 22 is applied to the programmable counter 24. In response, the counter 24 divides the frequency of the clock signal from the oscillator 23 by one of the division numbers D1–D4.

The signal from the programmable counter 24 is routed through the counter 25, ROM 26 and DAC 27 and output as a sinusoidal wave signal having one of the frequencies F1–F4 matching the frequency division number and a predetermined amplitude. Although the sinusoidal wave signal is input to the resistor network 28, the amplitude thereof is not lowered since the multiplexer 29 constantly selects the maximum amplitude on the junction A1. Since the frequency sequentially falls from F1 to F4 stepwise, a sinusoidal wave signal having a particular frequency is output in accordance with the result of comparison of the measured voltage V with the reference voltages V1–V4. Such a signal is output via the speaker 6 as a key tone. Hence, the pitch of the key tone decreases stepwise with a decrease in battery voltage.

The procedure described above allows the user of the notebook to see the residual amount of the battery capacity on the basis of the pitch of the key tone when operated the keyboard 2. When the residual amount is zero, the frequency division number is made infinite to prevent the key tone from being recognized as sound, i.e., to prevent it from being output. This allows the user to see that the battery has run down. The key tone ends (step S312) after the previously mentioned display (step S311).

The procedure of FIG. 7, like the procedure of FIG. 6 may measure the battery voltage at predetermined intervals, write the measured voltage to the memory 16, output a frequency division number signal matching the stored voltage in response to a key input from the keyboard 2, and thereby produce a key tone having a particular frequency. This successfully generates a key tone having a particular frequency immediately after the operation of a key.

Figure 8:
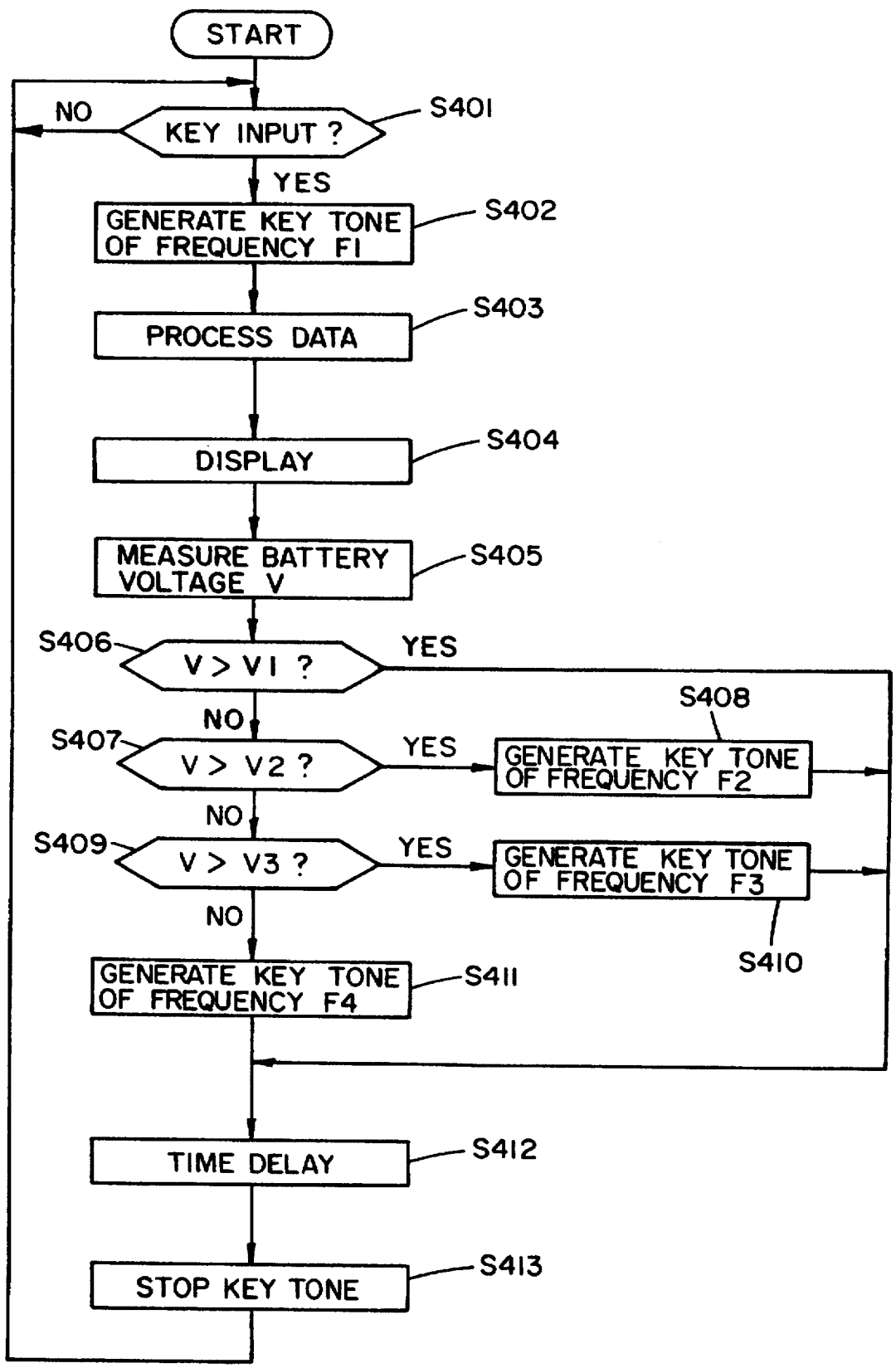
FIG. 8 is a flowchart representative of a modification of the procedure shown in FIG. 7.

A modification of the procedure shown in FIG. 7 will be described with reference to FIG. 8. As shown, in response to a key input (YES, step S401), the key tone having the frequency F1 is output unconditionally (step S402). Specifically, the division number D1 is fed from the setting circuit 22 to the programmable counter 24 in order to output the key tone of frequency F1, as in the procedure of FIG. 7. After data processing (step S403) and display processing (step S404), the battery voltage is measured (step S405). The measured voltage V is sequentially compared with the reference voltages V1–V3 (step S406), as in the procedure of FIG. 7. If V is higher than V1, the key tone of frequency F1 is continuously output (step S407). On the elapse of a period of time set in the timer 15 (step S412), the key tone ends (step S413). If V is lower than V1, but higher than V2 (YES, step S407), the key tone of frequency F2 is output (step S408). As a result, the frequency is switched from F1 to F2 halfway, i.e., the high pitch is replaced with a medium pitch halfway. If V is lower than V2, but higher than V3 (YES, step S409), the key tone of frequency F3 is output (step S410). Consequently, the frequency is switched from F1 to F3 halfway, i.e., the high pitch is replaced with another medium pitch lower than the above-mentioned medium pitch. Further, if V is lower than V3 (NO, step S409), the key tone of frequency F4 is output (step S411). As a result, the frequency is switched from F1 to F4 to replace the high pitch with a low pitch.

On noticing the change of the key tone from the high pitch to the medium pitch, the user can see that the residual amount of the battery capacity is small. On the change of the key tone from the high pitch to the low pitch, the user can see that the residual amount is extremely small. In this manner, the pocketbook informs the user of the residual amount of the battery capacity by changing the pitch, or frequency, of the key tone halfway. Again, the measured voltage may be written to the memory beforehand in order to set a particular frequency matching the stored voltage, as in the procedure of FIG. 6.

Figure 9:
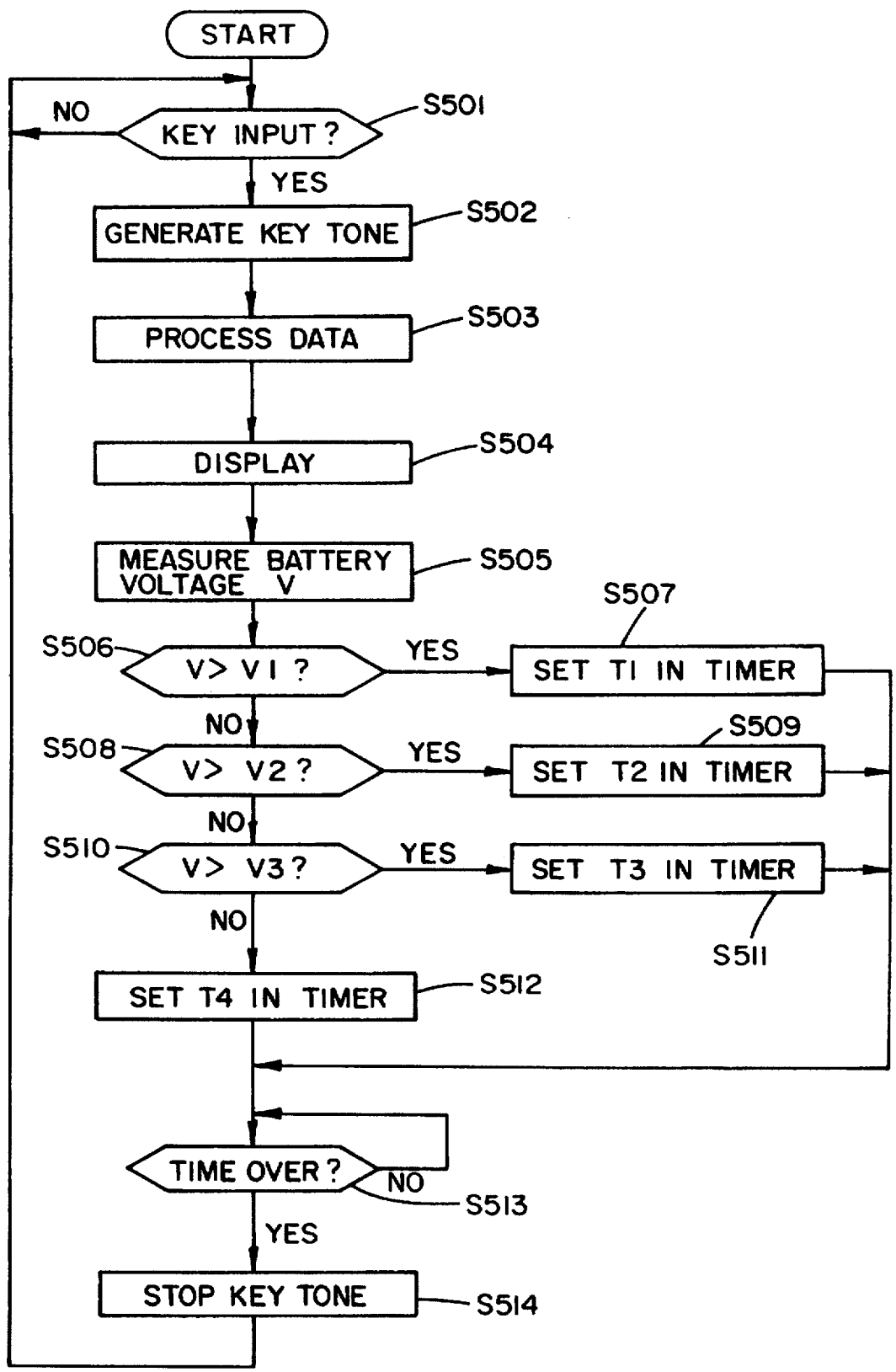
FIG. 9 is a flowchart showing a third key tone generation procedure available with the embodiment.

FIG. 9 shows a third key tone generation procedure also available with the embodiment. As shown, in response to a key input (YES, step S501), a key tone having a predetermined frequency and a predetermined amplitude is generated unconditionally (step S502). Specifically, the setting circuit 22 delivers a preselected frequency division number signal to the programmable counter 24 and a preselected amplitude signal to the analog multiplexer 29. As a result, a key tone of predetermined frequency and amplitude is output, as in the procedure of FIG. 7. After data processing (step S503) and display processing (S504) originally assigned to the pocketbook, the voltage measuring circuit 13 measures the battery voltage (step S505). The measured voltage V is sequentially compared with the reference voltages V1–V3, and the result of comparison is applied to the setting circuit 22. In response, the setting circuit 22 sends a particular duration signal to the timer 15, as follows. The setting circuit 22 selects a duration T1 (step S507) if V is higher than V1 (YES, step S506), selects a duration T2 (step S509) if V is lower than V1, but higher than V2 (YES, step S508), selects a duration T3 (step S511) if V is lower than V2, but higher than V3 (YES, step S510), or selects a duration T4 (step S512) if V is lower than V3 (NO, step S510) (T1>T2>T3>T4). The oscillator 23 is driven for duration selected. Consequently, the key tone of predetermined frequency and amplitude is continuously output on the basis of the clock signal. On the elapse of the duration (YES, step S513), the oscillation of the oscillator 23 and, therefore, the key tone ends (step S514).

The procedure shown in FIG. 9 may be modified such that the oscillation 23 is continuously driven while the duration of the key tone is changed by a switch.

The procedure of FIG. 9 reduces the duration of the key tone stepwise in accordance with the drop of the battery voltage. This informs the user of the drop of the battery voltage on the basis of the duration of the key tone. Again, the battery voltage may be measured beforehand and written to the memory in order to select a duration matching the stored voltage.

Various modifications will become possible for those skilled in the art after receiving the teachings of the present disclosure without departing from the scope thereof. For example, the frequency, amplitude and duration of the key tone may be changed in a suitable combination. Specifically, the frequency and amplitude of the key tone may be changed at the same time such that the pitch and loudness of the tone decrease with a drop of the battery voltage. Further, the duration may be changed together with the frequency and amplitude. This kind of scheme will further facilitate the distinction between the different key tones. If desired, the pitch, loudness and/or duration of the key tone may be increased with a decrease in the battery voltage.

What is claimed is:

1. An electronic apparatus powered by a battery and having a keyboard and capable of informing a user of a residual amount of a capacity of said battery, said apparatus comprising:

key tone generating means for generating a key tone when the keyboard is operated;

setting means for setting an attribute of the key tone;

measuring means for measuring the residual amount of the capacity of the battery; and control means for controlling said setting means in response to an output of said measuring means such that the attribute of the key tone changes.

2. An apparatus as claimed in claim 1, wherein said setting means outputs a setting signal indicating a frequency which changes in accordance with the residual amount of the capacity, said key tone generating means changing a frequency of the key tone in response to said setting signal.

3. An apparatus as claim in claim 1, wherein said setting means outputs a setting signal indicating an amplitude which changes in accordance with the residual amount of the capacity, said key tone generating means changing an amplitude of the key tone in response to said setting signal.

4. An apparatus as claimed in claim 1, wherein said setting means outputs a setting signal indicating a duration which changes in accordance with an instantaneous residual amount of the capacity, said key tone generating means changing a duration of the key tone in response to said setting signal.

5. An apparatus as claimed in any one of claims 1, further comprising:

a timer for counting a predetermined time interval; and storing means for storing the residual amount of the capacity measured by said measuring means;

said control means causing said measuring means to measure the residual amount of the capacity at said predetermined time interval counted by said timer, writing a result of measurement in said storing means, and causing, when the keyboard is operated, said setting means to set the attribute on the basis of said result of measurement stored in said storing means.

6. An apparatus as claimed in claim 1, wherein the battery comprises a replaceable battery or a rechargeable battery.

7. An apparatus as claimed in claim 1, wherein the attribute of the key tone comprises at least one of a loudness, pitch and duration of the key tone.

8. An apparatus as claimed in claim 1, wherein said measuring means measures a residual voltage of the battery as the residual amount of the capacity.

9. An electronic apparatus powered by a battery and having a keyboard, said apparatus comprising:

key tone generating means for generating a key tone when a key of the keyboard is operated;

measuring means for measuring the residual amount of the capacity of the battery; and control means for changing the key tone in response to an output of said measuring means.

10. A method of informing a user of an electronic apparatus powered by a battery and having a keyboard of a residual amount of capacity of said battery, said method comprising the steps of:

generating a key tone when a key of the keyboard is operated;

measuring the residual amount of the capacity of the battery; and changing the key tone in response to an output of said measuring step.

* * * * *

UNITED STATES PATENT AND TRADEMARK OFFICE
CERTIFICATE OF CORRECTION

PATENT NO. : 5,565,782
DATED : October 15, 1996
INVENTOR(S) : Osamu Sato

It is certified that error appears in the above-indentified patent and that said Letters Patent is hereby corrected as shown below:

Column 6, line 59: "an." should read --a--

Column 8, line 5: "0n" should read --On--

Signed and Sealed this

Tenth Day of June, 1997

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,565,782
DATED : October 15, 1996
INVENTOR(S) : Osamu Sato

It is certified that error appears in the above-indentified patent and that said Letters Patent is hereby corrected as shown below:

Column 9, line 20, Claim 3: "as claim" should read --as claimed--

Column 9, line 31, Claim 5: "in any one of claims 1" should read --in claim 1--

Signed and Sealed this

Fifteenth Day of July, 1997

Attest:

BRUCE LEHMAN

*Attesting Officer*      *Commissioner of Patents and Trademarks*